July 24, 1956 — E. RÜEGG — 2,755,934

MULTI-STAGE CENTRIFUGAL MACHINE

Filed Jan. 25, 1954

INVENTOR
Ernst Rüegg

By Dodge ... Imm
Attorneys

United States Patent Office 2,755,934
Patented July 24, 1956

2,755,934

MULTI-STAGE CENTRIFUGAL MACHINE

Ernst Rüegg, Kusnacht, Switzerland, assignor to Escher Wyss Aktiengesellschaft, Zurich, Switzerland, a corporation of Switzerland Application January 25, 1954, Serial No. 405,735

Claims priority, application Japan February 10, 1953

10 Claims. (Cl. 210—70)

This invention relates to a multi-stage continuously operable centrifugal machine which comprises a pusher member and at least two axially displaceable separator cages which are consecutively covered with material to be centrifuged, at least one of the cages serving as a thrust member for a following cage.

Such multi-stage centrifugal machines are used with advantage in cases where it is desired to have a large filter screen surface and a prolonged duration of stay of the material being centrifuged in the cage. In the type of construction which is already known, they are constructed in such manner that the individual cages are each positioned with a boss on a through-shaft mounted at both ends. The cages are connected to the associated boss by radially extending arms, which are also engaged by the devices for the axial displacement of the cages.

Owing to these fittings in the cages, the conveying on the cages of the material being centrifuged and also the feed thereof into the cages is impaired.

The invention has for its object to provide a multi-stage continuously operable centrifugal machine which is as far as possible free from internal fittings which impede the passage of the material to be centrifuged and which prevent the insertion of washing tubes. In order to achieve this object, according to the invention, the pusher member and the cages are arranged overhung on a driving shaft so as to be shiftable in relation to each other. The drive for the relative axial displacement of the said pusher member and the cages is expediently effected from the bearing end of the shaft.

Figure 1:
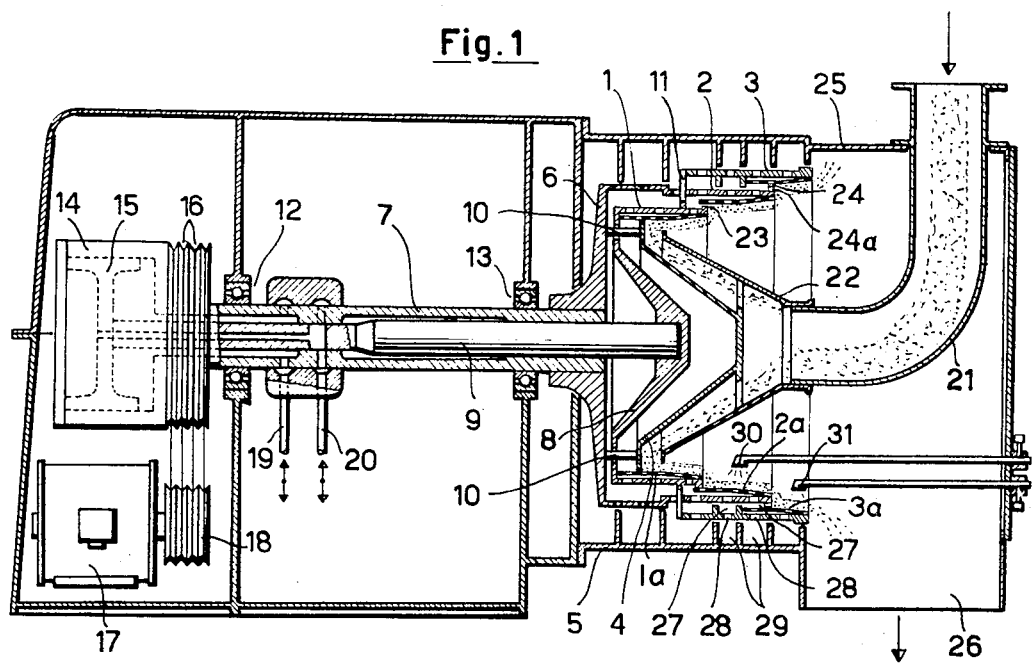
Figure 2:
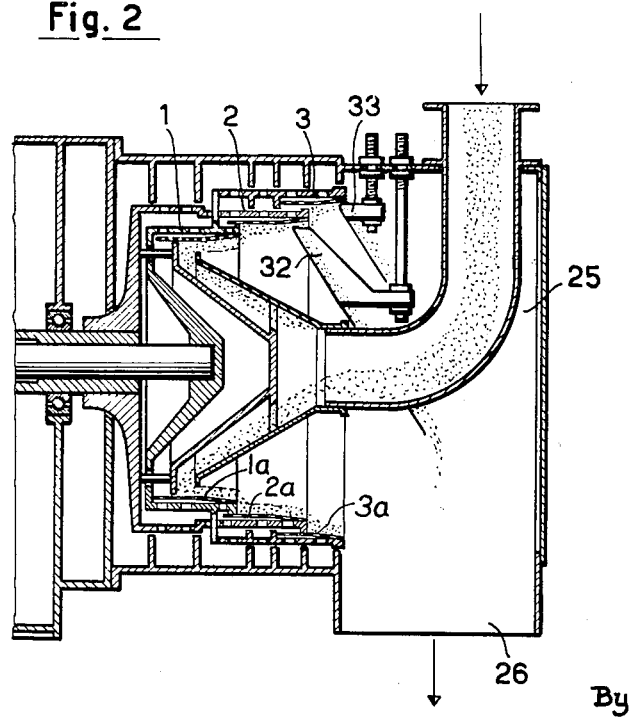

A multi-stage continuously operable centrifugal machine constructed in accordance with the invention is illustrated in simplified form and by way of example in the accompanying drawing, wherein:

Figure 1 is an axial longitudinal section through a centrifugal machine with a pusher member and three cages, and Figure 2 is another constructional form with special devices for the removal of the centrifuged material.

The multi-stage centrifugal machine illustrated in Figure 1 comprises three cages 1, 2, and 3 which are respectively provided with slightly flaring filter screens 1a, 2a, and 3a. Each screen enlarges to the right as shown in Figs. 1 and 2. The cages which have different diameters and are arranged coaxially in staggered position, are consecutively covered by the material to be centrifuged, and a pusher member 4 is arranged in the cage 1, the said cages being fitted in a housing 5. The cage 2 is fitted by means of a boss 6 in overhung relation on a hollow shaft 7. The cage 1, on the other hand, is arranged overhung with a boss 8 on a central shaft 9 extending inside the hollow shaft 7, the said shaft 9 rotating with the latter and being shiftable axially. The pusher member 4 is connected to the boss 6 of the axially immovable cage 2 by means of supports 10 which extend parallel with the axis of shaft 9 through the boss 6, the said cage 2 surrounding partially the cage 1. The cage 3 on the other hand is rigidly connected to the cage 1 by means of connecting elements 11 extending through the cage 2. The hollow shaft 7 is supported in two bearings 12 and 13.

The pusher member 4 and the cages 1, 2 and 3 are shiftable axially in relation to each other in such manner that with axial displacement of the central shaft 9 with respect to the hollow shaft 7 which is immovable axially, the cage 1 is shifted towards the axially immovable pusher member 4 and towards the cage 2, while the cage 3 connected fast to the cage 1 is also shifted axially towards the cage 2. The drive means for the relative axial shifting of the pusher member and the cages is located near the bearing end of the driving shaft. The axial displacement of the pusher member and the cages is here effected by liquid pressure which acts upon a piston 15 arranged in a cylinder 14 connected to the hollow shaft 7, said piston being rigidly connected through the central shaft 9 to the parts which are to be shifted axially.

The cylinder 14 is arranged overhung on that end of the shaft which is remote from the separator cages and serves at the same time as a belt pulley for the drive of the said shaft. For this purpose, the cylinder 14 is provided with grooves 16 engaged by V-belts which at the same time run over a belt pulley 18 associated with a driving motor 17. The liquid under pressure serving for the movement of the piston 15 is supplied and discharged through pipes 19, 20 in such a manner that an axial reciprocating movement is imparted to the central shaft 9 and the cages 1 and 3 connected therewith.

The material to be centrifuged is introduced through a fixed supply pipe 21 into the housing of the centrifugal machine and introduced into the cage 1 through a hopper 22 revolving with the cages. With an axial reciprocating movement of the cage 1, the arriving material to be centrifuged is continuously pushed towards the right through the pusher member 4 onto the filter screen of the cage 1 and is conveyed to the filter screen of the following cage 2. The cage 1 is formed at its right end with an out-turned flange 23 which serves as a pusher member for the material situated on the cage 2 with the axial reciprocating movement of the cage 1 and conveys the material towards the right, so that it reaches the filter screen of the following cage 3 which is shifted axially together with the cage 1. With the reciprocatory movement of the cage 3, an out-turned flange 24 arranged at the right end of the cage 2 in turn serves as a pusher member for the material deposited on the said cage 3 and finally conveys it into that part 25 of the housing which serves as receiver, from which it drops out in a downward direction through a trap 26.

Those parts of the individual cages which are covered by the material to be centrifuged are of different axial lengths, the said part always being shorter with the second of two consecutive cages than with the first of said two cages.

Such a construction of the cages has proved to be expedient when the material being centrifuged opposes an increasing frictional resistance to the axial movement owing to its progressive drying on the screen lining. By shortening the length of the cage contacted by the material in the case of the following cages, the necessary thrust force is prevented from increasing beyond the value which is permissible in view of the inward bending of the layer of material.

The length of the cage contacted with the material conveniently does not exceed 300 mm. and the length of the last cage which is contacted by the material being centrifuged is preferably chosen not to be greater than 100 mm.

In order to obtain a loosening of the centrifuged material during the passage through the cages, the latter comprise conically shaped screen portions which are enlarged towards the discharge end.

The steps at the transition from one cage to the other likewise effect a loosening of the material being centrifuged, this being particularly important with progressive drying of the said material. For this reason, the difference between the diameters of the two last cages 2 and 3 is greater than that between the diameters of the two preceding cages 1 and 2 which follow one another.

In many cases, materials are to be centrifuged in the hot state, it being expedient, however, with a view to preventing caking, or in order to exploit as far as possible a final drying by evaporation, that the solids should be removed from the machine in the cooled state. In connection with the multi-stage centrifugal machines, it is possible in a simple manner to provide means serving for the cooling of the material being centrifuged. For this purpose, with the centrifuge illustrated in Figure 1, ventilation holes 24a are, for example, arranged in the flange 24 of the cage 2, said ring serving as a pusher member for the material situated on the last cage. These holes permit, for example, the passage of a current of air, by which the solid material dropping from the cage 2 onto the cage 3 is cooled.

With the construction of the centrifugal machine in accordance with the invention, the individual cages and the pusher member may be interconnected in groups in any manner such that the solid material is conveyed from one cage to the next following with the mutual displacement of the two groups. For example, the centrifugal machine may be so fashioned that the pusher member of the first cage is reciprocated axially, the said pusher member being connected with the second cage and any additional cage which may follow next but one, while the first cage and the remaining cages are immovable axially. With the constructional form shown in Figure 1, the pusher member 4 of the first cage, on the contrary, is fixed axially, and thus the cage 2 connected thereto is also non-displaceable in the axial direction. On the other hand, the cage 1 preceding the cage 2 and the following cage 3 is imparted an axial reciprocating movement during the conveying process. This second solution offers certain constructional advantages, in that the pusher member 4 is adapted to be connected in a simple manner by supports, which are parallel with the shaft axis, and pass through the boss of the first cage, to the boss of the second cage which surrounds partially the first cage.

The constructional form illustrated, in which, as already mentioned, the last cage contacted by the material, i. e. the cage 3, is displaceable axially, offers the advantage that the material being centrifuged is distributed over a certain distance axially over the receiver housing on issuing from the last cage and therefore does not always impinge on the same point of the housing wall, as would be the case if the last cage were stationary.

In the region in which the cage 3 surrounds the preceding cage 2, the said cage 3 is subdivided on the inside into separate chambers 27, and these chambers open through discharge apertures 28 into corresponding receiver chambers 29 of the housing. In this manner, it is possible for example, by the supply of washing liquid, to separate the centrifuged liquid according to the progress of the centrifuging operation. Provided inside the centrifuging cage are nozzles 30, 31, which are adjustable axially and which serve as means for the supply of liquids or gases to the individual cages. These liquids may serve, for example, as washing liquids, or there may also be supplied gases for drying purposes.

Since the drying of the layer of centrifuged material on a cage has progressed to the greatest extent on the innermost side, while the parts on the outermost side, resting directly on the filter screen, still have a relatively large moisture content, it is in certain cases not necessary that the entire layer in the centrifuge should be carried forward as far as the last cage. If the material on the inside on one cage has already attained the required degree of dryness, it is expedient to provide means which render it possible for the material of one of the cages preceding the last cage to be at least partially discharged into the receiver housing.

In this connection, the constructional form of the invention which is illustrated in Figure 2 is provided with a scraper member 32 by which a part of the layer of centrifuged material in the cage 2 may be directly detached and led into the receiver housing 25. This scraper member is adjustable radially, so that a greater or lesser part of the layer of centrifuged material may be discharged, according to the condition of the material in the cage in question.

Instead of allowing the centrifuged material to issue outwardly from the end of the last cage and to impinge on the receiver housing, which may lead to an undesirable effect on the crystal structure of the centrifuged material, it is perhaps also expedient to discharge all the material from the last cage by means of scraper members. This is effected in the constructional form illustrated in Figure 2 by an additional scraper member 33, by which the centrifuged material is discharged into the trap 26 without any substantial sudden changes in speed and with the gentlest possible effect on the crystals.

What is claimed is:

1. A multi-stage continuously operable centrifugal machine comprising a rotary driving shaft supported in bearings; at least two foraminous separator cages of different diameters, arranged coaxially at an overhung end of said shaft so as to rotate with said shaft, in staggered position and shiftable in nested relation to each other in the axial direction of the shaft while turning with the shaft; said cages being open at their ends remote from the shaft; a housing enclosing said cages; a pusher member encircled by the innermost of said separator cages and connected so as to rotate with said shaft, said pusher member and said innermost separator cage being shiftable in relation to each other in the axial direction of the shaft during rotation; means for introducing material to be centrifuged into said innermost separator cage; means for shifting said pusher member and said separator cages in relation to each other in the axial direction of the shaft during rotation, said means being located near the bearing end of the driving shaft; and pusher rings, one ring being rigidly connected to the end of the inner one of every two consecutive separator cages and dimensioned to move in close proximity to the inner surface of the next outer separator cage, material to be centrifuged thus being conveyed consecutively from one separator cage to the next and finally discharged by axial shifting of the pusher member and the separator cages in relation to each other.

2. The multi-stage centrifugal machine defined in claim 1 in which at least one of said rings dimensioned to serve as pusher members is provided with ventilation holes.

3. The multi-stage centrifugal machine defined in claim 1 in which at least one separator cage at least partially surrounds a preceding cage and is subdivided on the inside into separate chambers opening through discharge apertures into corresponding receiver chambers of the housing.

4. The multi-stage centrifugal machine defined in claim 1 in which at least one cage comprises a conically fashioned screen portion which flares towards its discharge end.

5. A multi-stage continuously operable centrifugal machine comprising a hollow rotary driving shaft; a central shaft extending inside said hollow driving shaft, said central shaft being shiftable in axial direction within said hollow driving shaft while turning therewith; a first foraminous separator cage fixed in overhung relation on the end of said central shaft; a first pusher member encircled by said first separator cage and rigidly connected with said hollow driving shaft; means for introducing material to be centrifuged into said first separator cage; at least two further separator cages of larger diameter than the first separator cage, arranged consecutively in staggered position inter se and in relation to said first separator cage and coaxially thereto, alternate ones of said further consecutive separator cages being rigidly connected with the hollow driving shaft and with the first separator cage and the end of each separator cage which is followed by a next separator cage being externally flanged to serve as a pusher member for the next following separator cage; a housing enclosing said separator cages; a cylinder arranged on said hollow driving shaft so as to rotate therewith; a piston axially displaceable within said cylinder and rigidly connected through said central shaft to said first separator cage; and means for introducing liquid under pressure into said cylinder so as to produce an axial reciprocating movement of said piston.

6. The multi-stage centrifugal machine defined in claim 5 in which the said cylinder is arranged overhung at the end of the driving shaft which is remote from the separator cages and is formed as a belt pulley for driving the shaft.

7. A multi-stage continuously operable centrifugal machine comprising a hollow rotary driving shaft; a central shaft extending inside said hollow driving shaft and shiftable axially therein; a first foraminous separator cage overhung by means of a boss on an end of said central shaft; a second separator cage partially surrounding said first cage and fitted by means of a boss in overhung relation on said hollow driving shaft; a housing enclosing said cages; a pusher member enclosed by said first cage and rigidly connected by supports to the boss of said second cage, said supports passing through the boss of the first cage parallel with the shaft axis; a pusher ring rigidly connected to the end of said first cage and dimensioned to move in close proximity to the second cage, so as to serve as a pusher for material thereon; means for introducing material to be centrifuged into said first cage; and means for imparting an axial reciprocating movement to said central shaft and to said first cage connected thereto.

8. A multi-stage continuously operable centrifugal machine comprising a hollow rotary driving shaft; a central shaft extending inside said hollow driving shaft and shiftable axially therein; a first foraminous separator cage overhung by means of a boss on an end of said central shaft; a second separator cage partially surrounding said first cage and mounted by means of a boss in overhung relation on said hollow driving shaft; a third separator cage partially surrounding said second cage and rigidly connected to said first cage by means of connecting elements extending through said second cage; a housing enclosing said cages; a pusher member enclosed by said first cage and rigidly connected by supports to the boss of said second cage, said supports passing through the boss of the first cage parallel with the shaft axis; a pusher ring rigidly connected to the end of said first cage and dimensioned to move in close proximity to the second cage, so as to serve as a pusher for material thereon; a further pusher ring rigidly connected to the end of said second cage and dimensioned to move in close proximity to said third cage, so as to serve as a pusher for material thereon; means for introducing material to be centrifuged into said first cage; and means for imparting an axial reciprocating movement to said central shaft and to said first and said third cage connected therewith.

9. The multi-stage centrifugal machine defined in claim 1 in which the projection of successive cages, each beyond the next inner cage is progressively shorter, the projection of the outermost cage being the shortest.

10. The combination with a multi-stage centrifugal machine as defined in claim 1 of a fixed scraper which projects into that end of the next to outermost separator cage which is remote from the supporting shaft in a zone beyond the travel of the coacting pusher ring and in close proximity to the inner surface of said cage.

References Cited in the file of this patent

UNITED STATES PATENTS

| 536,298 | Rockman | Mar. 26, 1895 |
| 1,761,593 | Sharples | June 3, 1930 |
| 2,232,770 | Buddeberg | Feb. 25, 1941 |
| 2,331,959 | Buddeberg | Oct. 19, 1943 |
| 2,490,108 | Walkup | Dec. 6, 1949 |

FOREIGN PATENTS

| 95,753 | Germany | Jan. 12, 1898 |
| 221,961 | Germany | May 14, 1910 |